United States Patent [19]

Pelster

[11] Patent Number: 5,387,400
[45] Date of Patent: Feb. 7, 1995

[54] APPARATUS AND METHOD FOR WATER PURIFICATION USING OZONE GENERATED BY ULTRAVIOLET RADIATION WITH A CONTINUOUS FILAMENT BULB

[76] Inventor: Dennis E. Pelster, 4743 Jay Rd., Boulder, Colo. 80301

[21] Appl. No.: 218,268

[22] Filed: Mar. 25, 1994

[51] Int. Cl.⁶ .................................................. C02F 1/32
[52] U.S. Cl. .......................... 422/186.03; 422/186.07; 422/24
[58] Field of Search ............... 422/186.3, 24, 186.07

[56] References Cited

U.S. PATENT DOCUMENTS

| | | | |
|---|---|---|---|
| 1,845,376 | 2/1932 | Weld | 350/1.1 |
| 2,042,963 | 6/1936 | Rentschler et al. | 176/1 |
| 2,088,544 | 7/1937 | Braselton | 250/35 |
| 2,935,611 | 5/1960 | Myers | 250/49 |
| 2,989,632 | 6/1961 | Olson et al. | 250/46 |
| 3,235,325 | 2/1966 | Storchheim | 21/74 |
| 4,141,830 | 2/1979 | Last | 210/63 Z |
| 4,149,853 | 4/1979 | DesMarais, Jr. et al. | 44/50 |
| 4,179,616 | 12/1979 | Coviello et al. | 250/527 |
| 4,189,363 | 2/1980 | Beitzel | 204/157.1 R |
| 4,214,962 | 7/1980 | Pincon | 204/157.1 R |
| 4,273,660 | 6/1981 | Beitzel | 210/760 |
| 4,314,344 | 2/1982 | Johns et al. | 364/500 |
| 4,504,445 | 3/1985 | Walz | 422/186.15 |
| 4,655,933 | 4/1987 | Johnson et al. | 210/721 |
| 4,780,287 | 10/1988 | Zeff et al. | 422/186.3 |
| 4,990,311 | 2/1991 | Hirai et al. | 422/4 |
| 5,266,215 | 11/1993 | Engelhard | 210/748 |

OTHER PUBLICATIONS

McGraw-Hill Encyclopedia of Science & Technology, 6th ed., 1987, pp. 15–16.
Rice et al., "Handbook of Ozone Technology and Applications", vol. I, Ann Arbor Science, 1982, pp. 1–13, 127–141, 181–193.

*Primary Examiner*—Donald P. Walsh
*Assistant Examiner*—Daniel Jenkins
*Attorney, Agent, or Firm*—Thomas J. Loran

[57] ABSTRACT

The present invention provides a method and apparatus for the purification of water using a continuous filament ultraviolet light bulb source to produce radiation resulting in ozone production in gases containing oxygen. This gas containing the ozone is then injected into water where many undesirable bacteria, viruses, and organic and inorganic compounds are destroyed.

20 Claims, 1 Drawing Sheet

APPARATUS AND METHOD FOR WATER PURIFICATION USING OZONE GENERATED BY ULTRAVIOLET RADIATION WITH A CONTINUOUS FILAMENT BULB

BACKGROUND OF THE INVENTION

1. Field of the Invention

The present invention is generally directed to the purification of water by injecting ozone into water. An oxygen containing gas is directed by confined flow past a continuous filament bulb that produces ultraviolet radiation resulting in changing some of the oxygen into ozone. The ozone and remaining gas are then injected into water where ozone destroys many undesirable bacteria, viruses and other organic and inorganic compounds.

2. Description of the Prior Art

The use of ozone, having a chemical formula of $O_3$, to purify water has been known since the early 1900's. Ozone molecules readily oxidize many types of bacteria, viruses or organic contaminates contained in water to make them ineffective and thereby increase the purity of water.

Ozone is produced by subjecting oxygen, $O_2$, to electrostatic discharge. Ozone is also less efficiently produced by oxygen containing gas absorbing ultraviolet radiation. The efficiency of ultraviolet radiation production of ozone relates to the design of the ultraviolet light producing device, the amount of energy applied to the light source, the oxygen content of the gas, and temperature and pressure of the oxygen containing gas.

The most common ozone generators for water purification involving ultraviolet wave lengths relate to fluorescent devices having two electrodes separated by a glass tube containing a gas that will be bombarded by electrons passing between the electrodes. This ultraviolet light produced by this electron bombarded gas converts oxygen into ozone. These devices are described in U.S. Pat. Nos. 4,214,962, 4,273,660, 4,504,445, and 4,990,311. Electromagnetic fields are sometimes used in addition to these fluorescent tubes to enhance their efficiency.

In the 1930's single and connected continuous filament bulbs for the production of ultraviolet radiation were invented for therapeutic and hygienic purposes and for reduction of odors in refrigerators. These include U.S. Pat. Nos. 1,845,376, 2,042,963, and 2,088,544. These bulbs were designed for 110–120 Volts AC operation. In recent years these devices continued to be manufactured in only small batch quantities. One example is depicted on Spectronics drawing P-82173 that uses a capacitor or ballast. However, these bulbs offer no protection against possible viewer eye damage when inserted in standard outlets so remain relatively unused.

The power source for all existing ultraviolet ozone producing devices is electricity. Therefore, simply constructed devices that produce the most ozone for the least electric power are the most desired for water purification. The present invention provides a water purification apparatus and method for an improved production of ozone requiring less power with a simple design using a continuous filament bulb configuration.

SUMMARY OF THE INVENTION

The present invention provides an efficient method and apparatus for the purification of water using a continuous filament ultraviolet light bulb source to produce radiation resulting in ozone production from gases containing oxygen. This gas containing the ozone is then injected into water where many undesirable bacteria, viruses, and organic and inorganic compounds are destroyed.

In the broadly described apparatus, a gas containing oxygen is introduced into a chamber containing an ultraviolet light producing bulb having a continuous filament. The continuous filament provides a single electrical circuit inside the bulb. Ultraviolet light emitting rays of proper wave length converts some of the oxygen into ozone.

After the ozone is produced in the chamber, the gaseous mixture containing the ozone is injected into the water for mixing with the water and reacting with impurities contained in the water. This is accomplished by using well known restrictive water flow devices to increase water flow velocities, resulting in a low pressure at the restriction for gas injection and eliminating the need for pressurized gas containers, gas compressors or pumps. However, these positive pressure gas devices may also be used to move the oxygen containing gas through the ozone chamber of the present invention and to be forcibly injected into the water.

The present invention can be used to purify water for drinking purposes, spas, swimming pools, esthetic water pools and water falls for example as well as other uses where water needs purification.

Accordingly, one object of the invention is to provide an efficient and simple method of generating ozone for water purification.

Another object of the invention is to use a continuous filament ultraviolet light bulb source for generation of ozone for water purification.

Another object of the invention is to eliminate the ballast or capacitor in the electrical circuit for the continuous filament ultraviolet light source used for water purification.

Another object of the invention is to provide protection against possible visual damage from ultraviolet light when using continuous filament bulbs for generation of ozone for water purification.

DETAILED DESCRIPTION OF THE PREFERRED EMBODIMENTS

Figure 1:
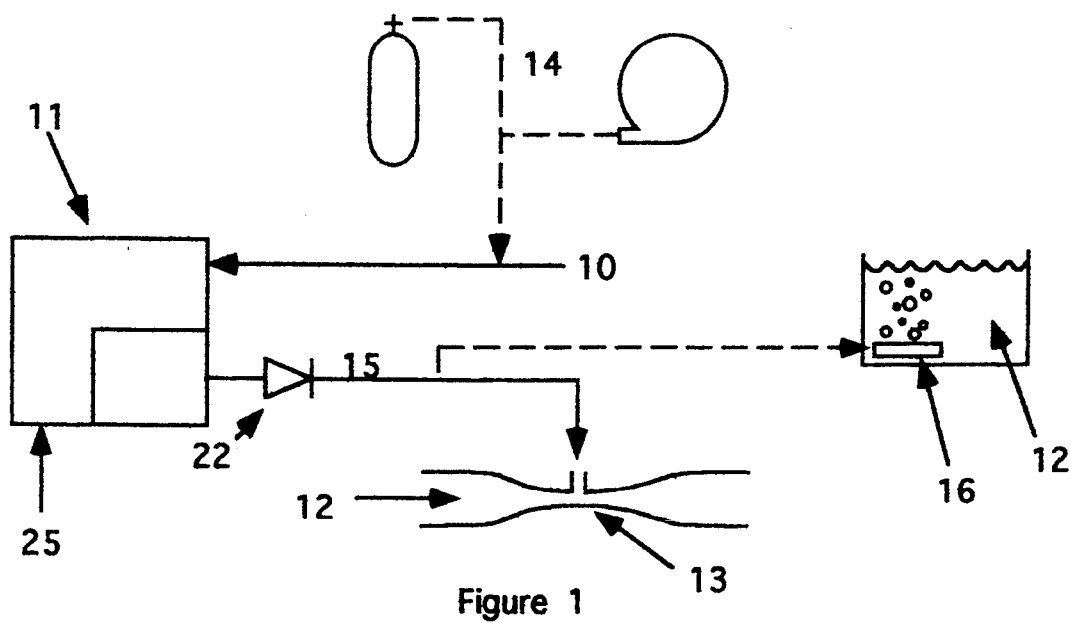
FIG. 1 is a flow chart of the present invention where a gas containing oxygen flows into a ozone generator device and the ozone containing gas is then injected into water for purification of the water.

As indicated in FIG. 1, a gas containing oxygen 10 is introduced into an enclosed ozone generator device 11. This gas may be air, pure oxygen, or any combination of gasses containing oxygen. Higher percentages of oxygen in the gas increase the efficiency of the conversion of oxygen molecules of $O_2$ into $O_3$. Optional gas dryers may be used to dry the gas prior to the ozone generator and thereby promote increased ozone production. The gas may be introduced into the ozone generator by reduced pressure techniques produced by well known methods where water 12 flowing through a restriction 13 increases in velocity and decreases in pressure, providing a reduced pressure at the high velocity area. These devices include but are not limited to venturi tubes, orifices, flow control valves, and jet valves. Introducing environmental air by this method for partial conversion into ozone produces a convenient process.

Pressure systems 14 such as but not limited to pressure tanks, compressors, pumps, blowers and similar methods may be used to inject the gas containing oxygen into the ozone generator device thereby forcing the gas containing ozone 15 to mix into the water 12 for water purification. The gas pressure as a minimum amount should be greater than atmospheric pressure. With a pressure system for gas injection, ozone containing gas distribution in the water is readily accomplished by but not limited to known techniques such as nozzles, porous sintered metal, ceramic, or plastic distribution devices 16 immersed in water promoting small, injected gas bubbles to distribute the ozone in water. A check valve 22 may be inserted in the ozone containing gas line to prevent any water back flow into the ozone generating device 11.

Figure 2:
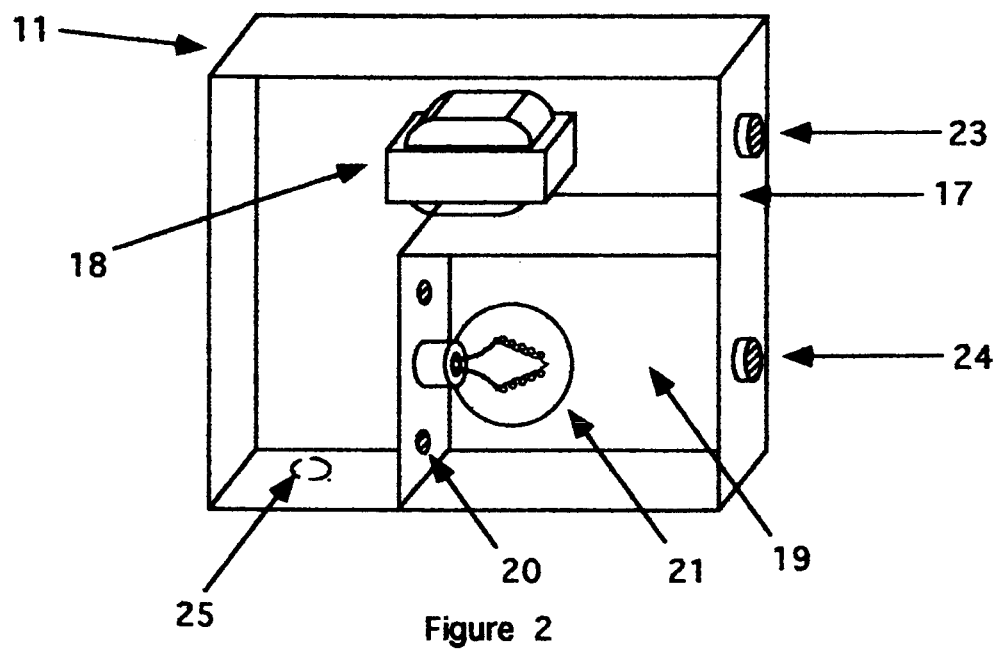
FIG. 2 is a perspective view of the ozone generator device with the cover removed to show/the components.

After the gas enters the ozone generating device 11, shown with cover removed in perspective view of FIG. 2, the gas containing oxygen 10 flows into the device housing 17 through inlet 23, and around a voltage reducing means such as a transformer 18. Electric power 25 connected to the transformer is used for high voltage power supplies and includes but is not limited to 110–120 volts AC or 200–240 volts AC. The transformer reduces the source voltage to lower voltages for powering the ultraviolet light bulb when lower voltages are desired. A ballast or capacitor may also be used in place of the transformer. Although continuous filament bulbs at the higher line voltages may be used, the lower voltage bulbs are preferred. Passing the gas containing oxygen around the transformer, ballast or capacitor cools the component for longer life and excites the gas 10 by warming the gas to a greater energy level for more efficient oxygen reaction into ozone.

The gas enters the ultraviolet light bulb chamber 19 through an angled entrance 20 that does not allow direct light passage out of the bulb chamber. This entrance could be for example but not limited to a 90° elbow, slanted hole, or any labyrinth design.

The gas 10 flows around an ultraviolet light bulb 21 that emits ultraviolet light producing ozone. This light bulb has a continuous filament and preferably uses low voltage. The continuous filament provides a single electrical circuit inside the bulb. Spectronics Corporation in Westbury, N.Y. part 4254G/OP is preferred. Other continuous filament bulbs producing ultraviolet wave lengths for ozone production having higher or lower alternating or direct current voltages may also be used. Although the bulb manufacturer states that ballast or capacitor should be used, excellent results were obtained with only a transformer for low voltage operation.

The ozone generating device housing and the ultraviolet light bulb chamber should be sealed for more efficient ozone production but the unit will operate without tight seals. The housing means 17 may be designed to eliminate direct visual contact by people when opened by not allowing power to the ultraviolet bulb when the device is opened. However, the housing may have a small ultraviolet translucent window to indicate light bulb operation. Construction materials for the ozone generating housing may be metal, plastic, or a combination of these materials.

The gas, having passed around the ultraviolet bulb, contains ozone and exits the ozone generating device through connection 24. The ozone containing gas is then injected into water for purification purposes.

Figure 3:
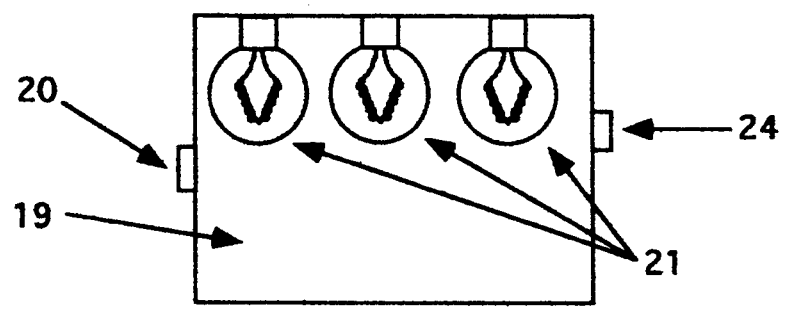
FIG. 3 is a view of a plurality of single filament ultraviolet bulbs in the ozone generator chamber.

For higher demands of ozone, a plurality of continuous filament bulbs may be used in the ozone generating chamber 19 as shown in FIG. 3. For some applications, this plurality of bulbs in one chamber produces more ozone while other applications may require a plurality of ozone generating devices each having continuous filament ultraviolet light producing bulbs.

Example I

The present invention using an ozone generating apparatus having a continuous filament ultraviolet light bulb made by Spectronics Corporporation, Corporation, Westbury, N.Y., part 4254G/OP, was evaluated in the engineering department of a local university. A transformer was used to reduce 110 volts AC to 12 volts AC. Pressurized air at 74° F. was introduced into the ozone generating device. The amount of ozone produced by the device was measured to be 1.28 grams of ozone per hour. Measured voltage was 12 volts AC and measured AC current was 0.35 amperes for the bulb during ozone production. The ozone generation rate was independent of air flow rates except at very low, inadequate air flows.

Comparison of this test is made to Gas Purification Systems Inc., Denver Colo. Model 5V consuming 0.50 amperes, 110 volts AC and producing 0.550 grams ozone per hour. This unit uses two separated electrodes and a fluorescent tube design similar to many other current models in the referenced patents.

Comparing the results of the above present invention example to present ozone generating models using separated electrodes indicates unanticipated and surprising improvements. Ozone production more than doubled for the apparatus using continuous filiament ultraviolet source with less input of power.

From the above description of the invention, various changes and modifications on the device will occur to those skilled in the art. All such modifications coming within the scope of the appended claims are intended to be included therein:

What I claim:

1. A water purification apparatus comprising:
   (a) a means for introducing a gas containing oxygen into an ultraviolet ozone generating device,
   (b) a light bulb means in said ultraviolet ozone generating device for producing ultraviolet light at wave lengths for changing said oxygen into ozone gas,
   (c) said light bulb means having a continuous filament and,
   (d) a means for introducing said ozone gas into water.

2. The water purification apparatus according to claim 1 wherein said ultraviolet ozone generating device contains a means for lowering voltages to said light bulb means.

3. The water purification apparatus to claim 1 wherein said means for introducing said gas containing oxygen into said ultraviolet ozone generating device is low pressure formed by water flow through a restricted flow area.

4. The water purification apparatus according to claim 1 wherein said means for introducing said gas containing oxygen into said ultraviolet ozone generating device is a high gas pressure source.

5. The water purification apparatus according to claim 1 wherein said gas containing oxygen is introduced around said light bulb means through an angled entrance.

6. The water purification apparatus according to claim 1 wherein said light bulb means operates using alternating current electricity.

7. The water purification apparatus according to claim 1 wherein said gas containing oxygen is air.

8. The water purification apparatus according to claim 1 wherein said means for injecting said ozone gas into water is a porous means for producing small gas bubbles.

9. The water purification apparatus according to claim 1 wherein a plurality of said light bulbs means for producing ultraviolet light are used in said ultraviolet ozone generating device.

10. The water purification apparatus according to claim 1 wherein a plurality of said ultraviolet ozone generating devices are used in said water purification apparatus.

11. A method of purifying water comprising the steps of:
  (a) introducing a gas containing oxygen into an ultraviolet ozone generating device,
  (b) providing in said ozone generating device a light bulb means with a continuous filament for producing ultraviolet light at wave lengths for changing said oxygen into ozone gas and,
  c) introducing said ozone gas into water.

12. The method of purifying water according to claim 11 wherein said ultraviolet ozone generating device contains a means for lowering voltages to said light bulb means.

13. The method of purifying water according to claim 11 wherein said means for introducing said gas containing oxygen into said ultraviolet ozone generating device is low pressure formed by water flow through a restricted flow area.

14. The method of purifying water according to claim 11 wherein said means for introducing said gas containing oxygen into said ultraviolet ozone generating device is a high pressure source.

15. The method of purifying water according to claim 11 wherein said gas containing oxygen is introduced around said light bulb means through an angled entrance.

16. The method of purifying water according to claim 11 wherein said light bulb means operates with alternating current.

17. The method of purifying water according to claim 11 wherein said gas containing oxygen is air.

18. The method of purifying water according to claim 11 wherein said light bulb means operates using alternating current electricity.

19. The method of purifying water according to claim 11 wherein a plurality of said light bulbs means for producing said ultraviolet light are used in said ultraviolet ozone generating device.

20. The method of purifying water according to claim 11 wherein a plurality of said ultraviolet ozone generating devices are used.

* * * * *